US011055811B2

(12) United States Patent
Hoppert et al.

(10) Patent No.: US 11,055,811 B2
(45) Date of Patent: *Jul. 6, 2021

(54) GRAPHICS PROCESSING UNIT PARTITIONING FOR VIRTUALIZATION

(71) Applicant: Microsoft Technology Licensing, LLC, Redmond, WA (US)

(72) Inventors: Hadden Mark Hoppert, Bellevue, WA (US); Christopher L. Huybregts, Kirkland, WA (US); Jacob Kappeler Oshins, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,365

(22) Filed: May 11, 2020

(65) Prior Publication Data

US 2020/0273140 A1    Aug. 27, 2020

Related U.S. Application Data

(63) Continuation of application No. 16/233,847, filed on Dec. 27, 2018, now Pat. No. 10,685,419, which is a continuation of application No. 15/423,276, filed on Feb. 2, 2017, now Pat. No. 10,204,392.

(51) Int. Cl.
*G06F 15/00* (2006.01)
*G06T 1/20* (2006.01)
(Continued)

(52) U.S. Cl.
CPC ............ *G06T 1/20* (2013.01); *G06F 9/45529* (2013.01); *G06F 9/45533* (2013.01);
(Continued)

(58) Field of Classification Search
CPC ......... G06F 9/45558; G06F 2009/4557; G06F 9/5044; G06F 9/505; G06F 9/5077;
(Continued)

(56) References Cited

U.S. PATENT DOCUMENTS 9,158,569 B2 * 10/2015 Mitra .................... G06F 9/4555
9,251,115 B2 *  2/2016 Bursell ............... H04L 41/0816
(Continued)

*Primary Examiner* — Hau H Nguyen
(74) *Attorney, Agent, or Firm* — Liang IP, PLLC

(57) ABSTRACT

Techniques for graphics processing unit (GPU) partitioning for virtualization are described herein. In one or more implementations, a GPU partitioning manager of a host device obtains a request for a virtual machine having GPU functionality. In particular, the request specifies the GPU functionality in terms of different GPU capabilities. These different capabilities correspond to segments of a GPU model that represents GPU functionality and is used to govern interactions between virtual machines and GPUs. The GPU partitioning manager determines whether GPUs of the host device are available to satisfy the request based on the specified capabilities. If so, the GPU partitioning manager allocates a portion of the determined available GPUs to the virtual machine to configure the virtual machine with a GPU partition having the functionality. The virtual machine configured with the GPU partition can then be exposed to provide GPU-processed data to a GPU partition requestor.

20 Claims, 7 Drawing Sheets

(51) Int. Cl.
  *G06F 9/455* (2018.01)
  *G06F 9/50* (2006.01)
(52) U.S. Cl.
  CPC .. *G06F 9/5044* (2013.01); *G06F 2009/45562* (2013.01); *G06F 2009/45579* (2013.01)
(58) Field of Classification Search
  CPC ......... G06F 9/5005; G06F 2009/45583; G06F 3/1438; G06T 1/00; G06T 2200/28; G09G 5/363; G09G 2360/06
  See application file for complete search history.

(56) References Cited

U.S. PATENT DOCUMENTS

| | | | |
|---|---|---|---|
| 9,436,493 B1* | 9/2016 | Thomas | G06F 21/6218 |
| 9,467,534 B2* | 10/2016 | Tidd | G06F 9/541 |
| 9,904,975 B2* | 2/2018 | Wilt | G06F 9/5044 |
| 2011/0083131 A1* | 4/2011 | Pirzada | G06F 9/45533 |
| | | | 718/1 |
| 2011/0102443 A1* | 5/2011 | Dror | G06F 9/45558 |
| | | | 345/522 |
| 2012/0084774 A1* | 4/2012 | Post | G06F 9/5088 |
| | | | 718/1 |
| 2012/0154389 A1* | 6/2012 | Bohan | G06F 9/5044 |
| | | | 345/419 |
| 2012/0254439 A1* | 10/2012 | Yamasaki | G06F 3/1438 |
| | | | 709/226 |
| 2014/0176583 A1* | 6/2014 | Abiezzi | G06F 9/45533 |
| | | | 345/522 |
| 2014/0282520 A1* | 9/2014 | Sabharwal | G06F 9/5027 |
| | | | 718/1 |

* cited by examiner

GRAPHICS PROCESSING UNIT PARTITIONING FOR VIRTUALIZATION

CROSS-REFERENCE TO RELATED APPLICATION(S)

This application is a continuation of and claims priority to U.S. patent application Ser. No. 16/233,847, filed Dec. 27, 2018, which is a continuation of and claims priority to U.S. patent application Ser. No. 15/423,276, filed Feb. 2, 2017, now U.S. Pat. No. 10,204,392, issued Feb. 12, 2019, the disclosure of which is incorporated herein in their entirety by reference.

BACKGROUND

In general, virtualization technologies have severed the one-to-one link between physical computing devices and operating systems by abstracting physical resources into virtualized resources. Virtualization allows multiple operating system instances or application instances to exist simultaneously on a same physical machine and in isolation from one another. Virtualization also enables multiple operating system instances to share a physical device's resources, such as to share storage devices, processing devices (e.g., graphics processing units (GPUs)), networking devices, and so forth. These advances have led to the centralization of many computing resources, enabling various computing tasks to be performed "over the cloud."

By way of example, individuals associated with an enterprise may be given accounts that allow them to access an enterprise-configured desktop interface—the desktop interface may be configured to provide productivity tools selected by the enterprise, storage hosted by the enterprise, and so on. The desktop interface associated with a given individual may also be accessible via multiple different computing devices, e.g., a desktop device at work, a laptop device at home, or a tablet device while traveling. Though accessible from these multiple different computing devices, the functionality provided by the desktop interface may be furnished largely using the processing and storage resources of the enterprise's servers, rather than resources of the computing devices the individuals interact with directly. Moreover, virtualization techniques enable the processing and storage resources of these same servers to be leveraged further to provide personal desktop interfaces simultaneously to multiple individuals of the enterprise. Advances continue to be made in virtualization technologies, such as improving the speed with which computing tasks can be completed using virtual machines or reducing the cost of implementing systems by employing virtual machines. Nonetheless, some conventional techniques for implementing virtualization can be expensive, vulnerable to security breaches, or tied to particular host-device hardware configurations. Consequently, virtualization may not be leveraged for many applications.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for graphics processing unit (GPU) partitioning for virtualization are described herein. In one or more implementations, a GPU partitioning manager of a host device obtains a request for a virtual machine having GPU functionality. In particular, the request specifies the GPU functionality in terms of different GPU capabilities. These different capabilities correspond to segments of a GPU model that represents GPU functionality and is used to govern interactions between virtual machines and GPUs. The GPU partitioning manager determines whether GPUs of the host device are available to satisfy the request based on the specified GPU capabilities. If there are, the GPU partitioning manager allocates at least a portion of the determined available GPUs to the virtual machine to configure the virtual machine with a GPU partition having the functionality. The virtual machine configured with the GPU partition can then be exposed to a requestor of the partition and to provide GPU-processed data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
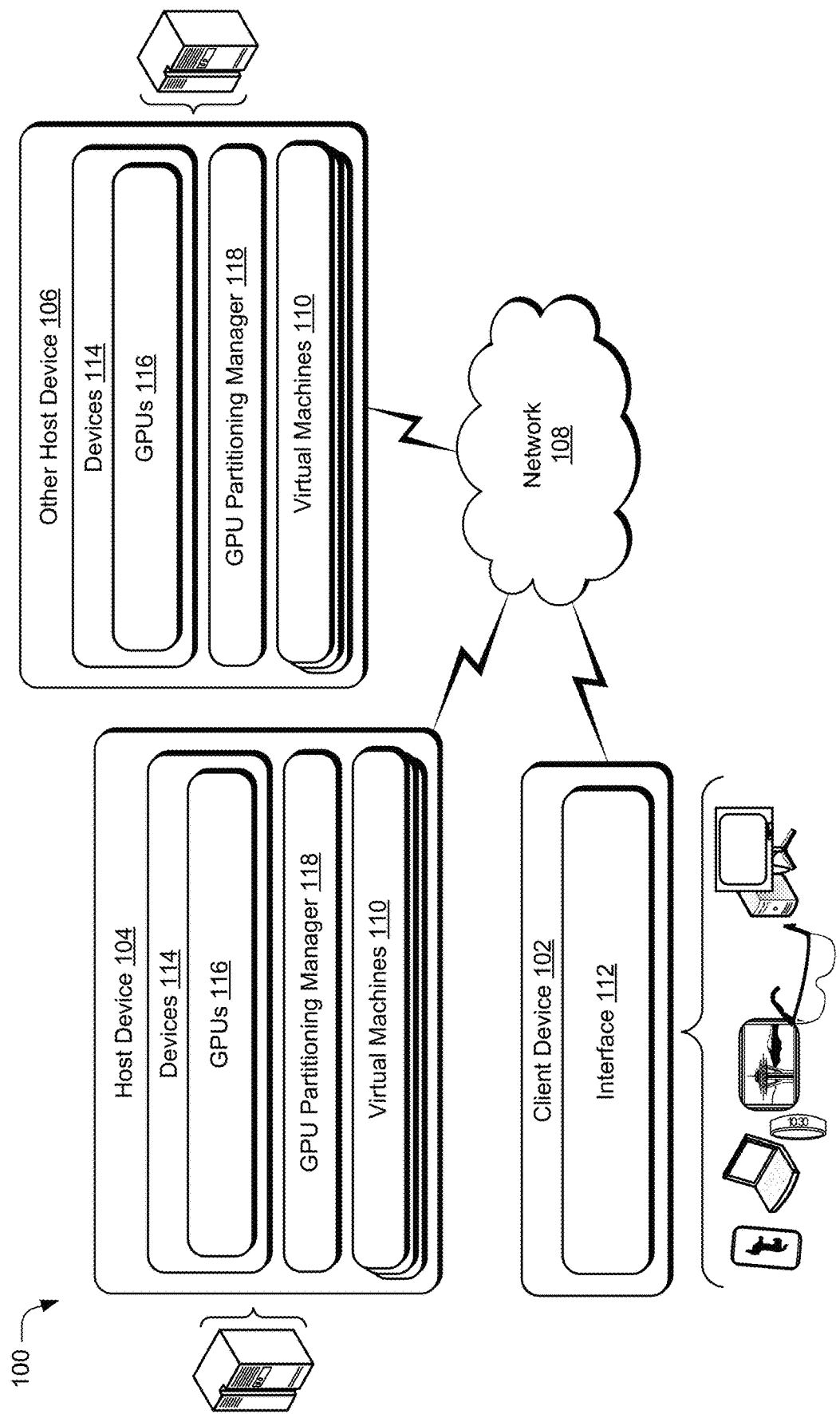
FIG. 1 is an illustration of an environment in an example implementation that is operable to employ techniques described herein.

Advances continue to be made in virtualization technologies, e.g., improving the speed with which computing tasks can be completed using virtual machines, reducing the cost of implementing systems by employing virtual machines, or decoupling functionality from particular host hardware configurations. Nonetheless, some conventional techniques for implementing virtualization may be prohibitive to more widespread adoption. In some scenarios, virtualization can be implemented by host devices that furnish a host operating system. Under the host operating system, multiple guest operating systems can be instantiated. These guest operating systems may be referred to as "virtual machines," which can emulate computing devices and provide the functionality of physical computers. In many scenarios, however, virtualization is implemented without a host operating system. Instead, the hosting system is implemented using a virtual manager (e.g., a Type-1 hypervisor) configured with a module for controlling resources and access to the resources of a respective host device.

In connection with providing the functionality of physical computers, virtual machines typically leverage the physical devices of respective host devices at some level. Host devices configured according to conventional techniques may include a variety of different physical devices to furnish virtual machines with a wide range of desired functionality. Examples of such physical devices include storage devices, networking devices, and processing devices (graphics processing units (GPUs)). In many scenarios, virtual machines may leverage GPUs of a host device to provide rendered scenes (e.g., for cloud-hosted video games, high-definition (HD) three-dimensional (3D) images, or virtual reality environments), video encoding and decoding, data processing, massive-scale computing, and so on. However, conventional techniques that enable virtual machines to leverage GPUs may be tied to the particular GPUs with which a host device is configured. Using conventional techniques, for instance, a virtual machine requesting GPU processing may have to configure a request in a format that is specific to providers of the GPUs onboard a respective host. Without a provider-agnostic manner with which to request GPU processing, it may be difficult to update the hardware of host machines, host providers may be tied to particular GPU providers, virtual machines may need to configure requests for GPUs to indicate values for a large number of different parameters, and so forth.

Accordingly, GPU partitioning for virtualization is described. In one or more implementations, requesting and providing partitions to fulfill GPU processing in connection with virtual machines is based on a partitioning abstraction model for GPUs. In particular, the abstraction model is divided into segments that represent a predetermined set of GPU capabilities. The abstraction model can thus be used to express the capabilities of a given GPU or desired capabilities of a GPU, e.g., in requests for a partition of one or more GPUs to handle GPU processing. In accordance with the described techniques, the GPU abstraction model may include segments for video encoding, video decoding, GPU random access memory (RAM), and GPU computing. In general, video encoding relates to a GPU's ability to generate encoded video (e.g., MP4) from raw video files, video decoding relates to a GPU's ability to play encoded video and video files (e.g., raw video files), GPU RAM relates to a working set of memory available to a GPU, and GPU computing relates to an amount of work a GPU is capable of doing (e.g., number of gigaflops of floating point performance). As discussed below, however, the described techniques may also be implemented based on a partitioning abstraction model having different segments, e.g., a greater number of segments, fewer segments, or segments representing different GPU-capabilities.

Requesting and fulfilling GPU processing may be based on this model, at least in part, because requests for partitions of GPUs and fulfillment notifications are configured according to the segments. By way of example, a request may be made for a virtual machine configured with a GPU partition having at least some amount of GPU encoding for the virtual machine, at least some amount of GPU decoding for the virtual machine, at least some amount of GPU RAM for the virtual machine, and at least some amount of GPU computing for the virtual machine. Similarly, a host device can notify a requestor (e.g., another virtual machine making the request or a client device) regarding fulfillment in terms of the same segments, e.g., a fulfillment notification indicating an amount of GPU encoding, GPU decoding, GPU RAM, and GPU computing, provided to the virtual machine by an allocated GPU partition. The amounts requested and provided in fulfillment may be governed by service agreements, e.g., if a requestor has paid for 2.5 gigabytes (GB) of GPU RAM then a host may provide the requestor with a virtual machine having a GPU partition with 2.5 GB of GPU RAM and indicate this in a fulfillment notification. This example model thus simplifies the number of attributes to four that GPU requestors and providers are concerned with in connection with GPU processing.

The techniques described herein allow virtual machines to leverage functionality of a host's GPUs via device drivers that are configured according to the partitioning abstraction model. To do so, hosts maintain device drivers that correspond to the GPUs of the hosts. These device drivers are used to determine whether a host's GPUs can provide functionality requested by a client, e.g., whether the host's GPUs can provide the requested minimum video encoding, video decoding, GPU RAM, and GPU computing. By way of example, the device drivers may convert requests configured based on the above-described model to commands that are specific to a respective GPU. Once it is determined that a GPU of a host is capable of providing GPU processing meeting the requested capabilities, a virtual machine may be configured with functionality of the determined GPU (or GPUs). The configured virtual machine may then be exposed to a requesting virtual machine or requesting client.

Utilizing the techniques described herein, configuring host devices may be simplified because host providers can choose any of a variety of GPUs with which to configure the host devices. This can result in a number of efficiencies for systems that employ GPU partitioning for virtualization, such as reducing costs because host providers can choose between different GPU providers, simplifying an interface between GPU-partition requestors and hosts, reducing equipment footprint, reducing power consumption, or improving the speed with which virtual machines deliver functionality to GPU-partition requestors.

In the following discussion, an example environment is first described that may employ the techniques described herein. Example procedures and implementation details are then described which may be performed in the example environment as well as other environments. Consequently, performance of the example procedures and details is not limited to the example environment and the example environment is not limited to performance of the example procedures and details.

Example Environment

FIG. 1 illustrates an operating environment in accordance with one or more embodiments, generally at 100. The environment 100 includes a client device 102, a host device 104, and another host device 106. The environment also includes network 108. Although the illustrated environment 100 includes the client device 102, in some implementations the described techniques may be utilized for applications that do not involve client devices. Instead, virtual machines 110 of the host device 104 may interact with one another (or the virtual machines 110 of the other host device 106) via command queues. Such interactions may involve pushing and/or pulling data to a service run locally by one of the virtual machines 110.

In scenarios that involve client devices, the client device 102 can be embodied as any suitable device, such as a desktop, a smartphone, a tablet computer, a portable computer (e.g., a laptop), a desktop computer, a set-top box, a game console, or a wearable device. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown, in some instances the computing device may be representative of a plurality of different devices, such as multiple servers of a service provider utilized by a business to perform operations, provide a datacenter, and so on. Further examples of computing systems and devices suitable to implement techniques described herein are described below in relation to FIG. 7

The host device 104 and the other host device 106 may be implemented by one or more computing devices, such as one or more servers of a datacenter, and may also be representative of one or more entities. In accordance with one or more implementations, the host device 104 and the other host device 106 may represent functionality of a service provider to provide one or more services to the client device 102 and/or to each other over network 108. In general, service providers may make a variety of resources (e.g. content and services) available over the network 108. Generally, resources made accessible by a service provider may include any suitable combination of services and/or content typically made available over a network by one or more providers. Some examples of services include, an online gaming service, an accelerated rendering service, a virtual networking service (e.g., cloud computing), a streaming content service, a data storage service, a search service, an email service, an instant messaging service, an online productivity suite, and an authentication service to control access of clients to the resources. Content may include various combinations of text, multi-media streams, documents, application files, photos, audio/video files, animations, images, web pages, web applications, device applications, content for display by a browser or other client application, and the like.

Although the network 108 is illustrated as the Internet, the network may assume a wide variety of configurations. For example, the network 108 may include a wide area network (WAN), a local area network (LAN), a wireless network, a public telephone network, and/or an intranet. Further, although a single network 108 is shown, the network 108 may be configured to include multiple networks.

The host device 104 and the other host device 106 are each illustrated as including virtual machines 110. The virtual machines 110 may be implemented as part of providing the above-mentioned services. Additionally, the virtual machines 110 may be implemented by virtual machine managers (not shown) of the host device 104 and the other host device 106. In general, a virtual machine manager may be capable of managing the creation (referred to herein as "instantiation"), operation, and termination of the virtual machines 110. In at least some implementations, the virtual machine managers are configured as instances of hypervisor that run on a respective host device. Further, the virtual machines 110 represent instances of virtual machines hosted by respective host devices.

To enable interactions between the client device 102 and the virtual machines 110, the client device 102 includes interface 112, which represents functionality to enable the client device 102 to interface with the host device 104 and/or the other host device 106 as well as with the virtual machines 110. For instance, the interface 112 supports functionality to request that a virtual machine manager instantiate one of the virtual machines 110 for the client device 102, such as a virtual machine configured with a GPU partition having a requested amount of GPU encoding, GPU decoding, GPU random access memory (RAM), and GPU computing. The interface 112 may also provide other functionality to the client device 102, such as enabling a fulfillment status of a GPU partition request to be determined and/or requests to be manipulated. The interface 112 may also provide a virtual-machine graphical interface, for instance, that indicates a status of different virtual machines to which the client device 102 is permitted visibility.

At some level, the functionality and/or services provided via the virtual machines 110 are provided, at least in part, using actual physical devices of the host device 104 and the other host device 106. Although devices 114 may include a variety of different physical devices to provide a range of functionality, the devices 114 also include GPUs 116. The GPUs 116 represent functionality to process GPU-input data, such as to render complex graphics (e.g., high-definition (HD) scenes, three-dimensional (3D) scenes), encode and decode videos, learn models and neural networks from deep learning data sets, and so forth. The GPUs 116 thus represent functionality to perform processing for both rendering and non-rendering scenarios. In accordance with the described techniques, capabilities of the GPUs 116 can be described according to a partitioning abstraction model. In some implementations, for instance, the capabilities can be described by an abstraction model that is segmented into a GPU encoding segment, a GPU decoding segment, a GPU RAM segment, and a GPU computing segment.

In other words, the GPUs 116 may be described in terms of an amount of GPU encoding they can handle, GPU decoding they can handle, GPU RAM available, and GPU computing they can handle. As used herein, the term "GPU encoding" refers to an ability of a GPU to generate encoded video (e.g., MP4) from raw video files. The term "GPU decoding" refers to a GPU's ability to play encoded video and video files (e.g., raw video files). Further, the term "GPU RAM" refers to a working set of memory available to a GPU. Finally, the term "GPU computing" refers to an amount of work a GPU is capable of doing, e.g., a number of gigaflops of floating point performance. Although the techniques herein are described largely in relation to this 4-segment abstraction model, a different model having different segments to describe the capabilities of GPUs may also be used without departing from the spirit or scope of the described techniques.

The host device 104 and the other host device 106 are also each illustrated with a GPU partitioning manager 118. In one or more implementations, the GPU partitioning manager 118 is part of the above-discussed virtual machine manager. In accordance with the described techniques, the GPU partitioning manager 118 may be capable of receiving requests for GPU partitions capable of requested amounts of GPU processing from GPU-partition requestors, such as one of the virtual machines 110 or the client device 102. As mentioned above and below, the requests may be configured according to the partitioning abstraction model for GPUs. Continuing with the example in which the model is defined to have GPU encoding, GPU decoding, GPU RAM, and GPU computing partitions, the requests may be configured to request amounts of these capabilities. In one or more implementations, the host device 104 and the other host device 106 include GPU drivers (not shown), which the GPU partitioning manager 118 utilizes to determine whether one of the GPUs 116 having the requested capabilities is available. If the GPU partitioning manager 118 determines that a GPU having the requested capabilities is available, the GPU partitioning manager 118 can configure one of the virtual machines 110 to leverage a GPU partition with functionality corresponding to at least a portion of the determined GPU.

This virtual machine 110 may also be configured with the respective driver or to identify the respective driver in order to enable the virtual machine 110 to provide data for processing to the allocated partition of the determined GPU. Further, the respective driver enables the virtual machine to manipulate the allocated partition of the GPU to process the data and produce GPU-processed data (e.g., rendered scenes, encoded video, decoded video, learned models and neural networks). The GPU partitioning manager 118 may expose the virtual machine to which the GPU partition is allocated to the GPU-partition requestor. In some scenarios, the GPU partitioning manager 118 configures the virtual machines 110 with a partition of a single GPU 116 as a full virtual device, enabling the functionality of the GPU to be shared among multiple virtual machines 110.

In accordance with one or more implementations, the host device 104 and/or the other host device 106 may be configured with a virtual peripheral component interconnect (PCI) infrastructure. In such scenarios, the GPU partitioning manager 118 can use the virtual PCI infrastructure to expose partitions of the GPUs 116 to the virtual machines 110 in a way that appears like a physical GPU (because the partition is attached to PCI) would appear. In so doing, the GPU partitioning manager 118 may expose partitions of the GPUs by presenting virtual devices in a way that mimics PCI Express (PCIe) devices. Additionally, this allows a same operating system infrastructure to be utilized for configuration and driver loading in connection with leveraging GPU partitions.

By accessing GPU functionality according to the described partitioning abstraction model for GPUs, the virtual machines 110 can leverage different GPUs 116. For example, this allows a GPU-processing workload to be mapped onto different GPUs and/or differently configured partitions of a same GPU. Additionally, the virtual machines 110 are not tied to any specific GPU of a host provided by a specific GPU provider, and hosts are also not tied to GPUs from specific GPU providers. This enables the virtual machines 110 to switch between different GPUs and different partitions of GPUs, for instance, based on the availability of GPU capabilities.

Having described an example operating environment, consider now example details and techniques associated with one or more implementations.

Graphics Processing Unit Partitioning for Virtualization

To further illustrate, consider the discussion in this section of example scenarios, components, and procedures that may be utilized to partition graphic processing units (GPUs) for virtualization. In general, functionality, features, and concepts described in relation to the examples above and below may be employed in the context of the example procedures described below. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Partitioning Abstraction Model for GPUs

Figure 2:
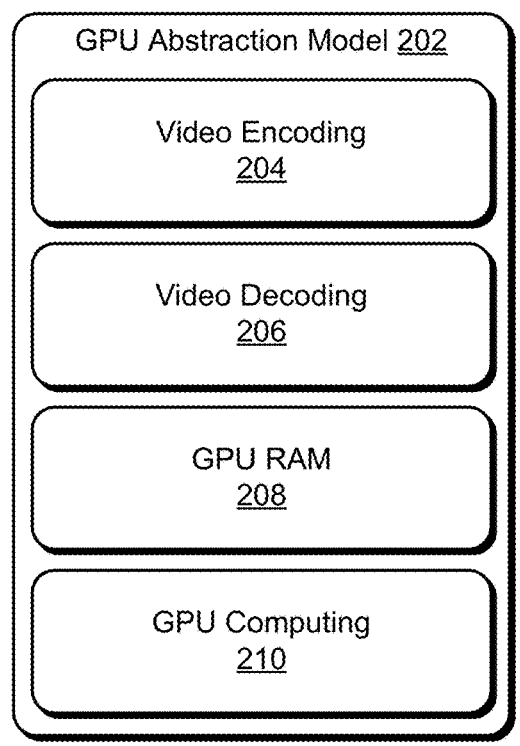
FIG. 2 is a diagram depicting an example abstraction model of a graphics processing unit (GPU) to partition GPUs for virtualization in accordance with one or more implementations.

FIG. 2 depicts generally at 200 an example abstraction model of a graphics processing unit (GPU) for partitioning GPUs for virtualization in accordance with one or more implementations. The example 200 depicts GPU abstraction model 202, which includes segments for video encoding 204, video decoding 206, GPU RAM 208, and GPU computing 210.

In general, the GPU abstraction model 202 is used to describe the capabilities of GPUs. Given the depicted GPU abstraction model 202, for instance, GPUs are described in terms of capabilities to encode and decode video, amount of GPU RAM, and GPU computing capability. Further, the GPU abstraction model 202 governs how requests for GPU processing and fulfillment notifications are configured. By way of example, the GPU abstraction model 202 defines parameters that a GPU-partition requestor specifies when requesting GPU processing in connection with one of the virtual machines 110. With reference to the depicted GPU abstraction model 202, for instance, a request for GPU processing is to be configured to request a GPU partition having a specified amount of video encoding capabilities, a specified amount of video decoding capabilities, a specified amount of GPU RAM, and a specified amount of GPU computing capabilities. In addition to allowing requests to specify values for the parameters, the host device 104 or the other host device 106 may specify values for defining GPU partitions that can simply be requested. By way of example, the host device 104 may define a "GPU 1" partition that can be requested, e.g., rather than forming a request with specific capabilities, a GPU-partition requestor may simply configure the request with an identifier corresponding to GPU 1. The host device 104 may define a requestable GPU partition, for instance, by specifying an amount of GPU encoding capabilities, an amount of video decoding capabilities, an amount of GPU RAM, and an amount of GPU computing capabilities that are to be allocated to the GPU.

Although the model depicted in FIG. 2 may govern allocation of partitions of the GPUs 116 to the virtual machines 110 in one or more implementations, GPU-partition allocation may also be governed based on different GPU abstraction models without departing from the spirit or scope of the techniques described herein. For instance, a GPU abstraction model having five segments, thirty-two segments, or segments representing different capabilities may be used to govern GPU-partition allocation to virtual machines.

Regardless of the particular segments specified for the GPU abstraction model 202, the GPU abstraction model 202's segments can also be used to configure drivers corresponding to the GPUs 116. In particular, the GPU abstraction model 202 provides GPU developers with an indication of inputs that will be received (e.g., a format of requests) by their respective GPU drivers in connection with GPU processing. The GPU abstraction model 202 also provides GPU developers with an indication of outputs (e.g., a format of fulfillment notifications) expected from their respective GPU drivers in connection with the GPU processing.

In implementations where the depicted abstraction model is used to define interactions between client devices, host devices, virtual machines, GPUs, and the GPU partitioning manager 118, the depicted segments may represent capabilities of GPUs in a similar manner as discussed above. In particular, the video encoding 204 segment may represent a GPU's ability to generate encoded video (e.g., MP4) from raw video files. The video decoding 206 segment may represent a GPU's ability to play encoded video and video files (e.g., raw video files). The GPU RAM 208 segment may represent an amount of working memory available to a GPU. Further, the GPU computing 210 segment may represent an amount of work a GPU is capable of doing (e.g., number of gigaflops of floating point performance). Additionally, a GPU partition can be configured with GPU resources of each segment, such that a GPU partition has some amount of video encoding capability, video decoding capability, GPU RAM, and GPU computing capability.

Example Scenario

Figure 3:
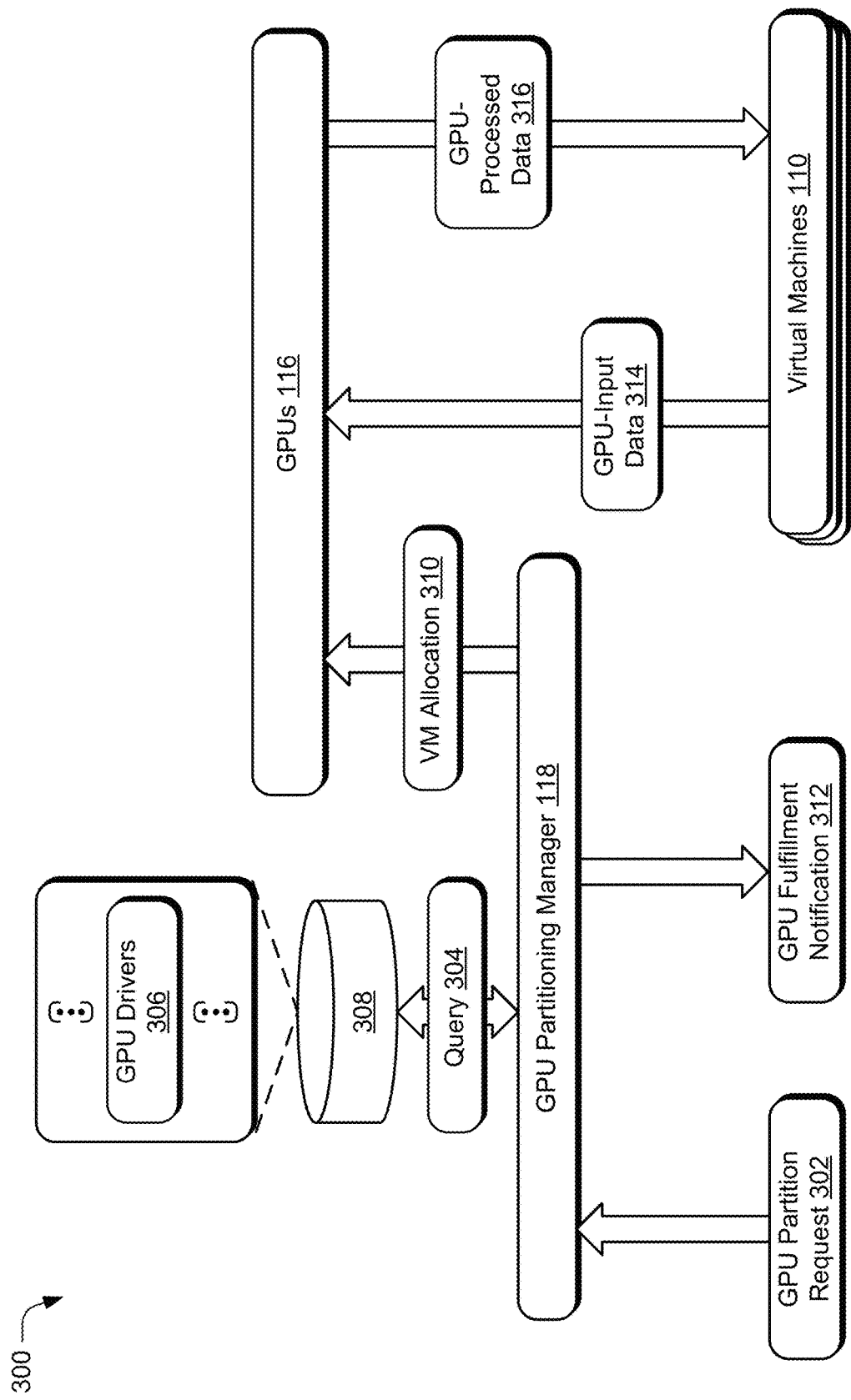
FIG. 3 is a diagram depicting an example scenario in which GPUs of a host are allocated to virtual machines to deliver requested GPU processing in accordance with one or more implementations.

FIG. 3 depicts generally at 300 an example scenario in which GPUs of a host are allocated to virtual machines to deliver requested GPU processing in accordance with one or more implementations. The example scenario 300 includes, from FIG. 1, the virtual machines 110, the GPUs 116, and the GPU partitioning manager 118.

The example scenario 300 also includes GPU partition request 302, which represents a request from a GPU-partition requestor (e.g., one of the virtual machines 110 or the client device 102) for one of the virtual machines 110 configured with a GPU partition capable of a requested amount of GPU processing. In particular, the GPU partition request 302 requests a GPU partition in terms of the GPU abstraction model 202, as described in more detail in relation to FIG. 4A. The GPU partition request 302 may be received from GPU-partition requestor by the GPU partitioning manager 118. Based on the GPU partition request 302, the GPU partitioning manager 118 may query 304 GPU drivers 306 to determine whether any of the GPUs 116 (or portions thereof) can be leveraged by one of the virtual machines to meet the request. The GPU drivers 306 are illustrated as being stored in storage 308, which may be included as part of the host device 104, the other host device 106, or a trusted remote storage service, for example. When queried by the GPU partitioning manager 118, the GPU drivers 306 are configured to be executing in memory, e.g., of the host device 104 or the other host device 106.

The GPU drivers 306 represent functionality to receive GPU partition requests configured according to the GPU abstraction model 202. The GPU drivers 306 also represent functionality to convert parameters of those requests to a format specific to a respective GPU 116—for determining whether the respective GPU has the requested capabilities available or a partition of the respective GPU can be configured with the requested capabilities. The GPU drivers 306 are further configured to convert availability information supplied by the respective GPU to fulfillment information configured according to the GPU abstraction model 202. Additionally, the GPU drivers 306 enable partitions of the respective GPUs to provide GPU-processing when determined available and allocated to a virtual machine.

In any case, based on the query 304 the GPU partitioning manager 118 determines which of the GPUs 116, if any, are available to satisfy the GPU partition request 302. If one or more of the GPUs 116 is determined to be available, the GPU partitioning manager 118 allocates a GPU partition corresponding to at least a portion of an available GPU to a virtual machine 110 that is to be exposed to GPU-partition requestor. This allocation is represented by VM allocation 310. The VM allocation 310 may involve configuring a virtual machine 110 with a GPU partition corresponding to the allocated GPU 116, including configuring the virtual machine with a respective GPU driver 306 to enable interaction between the virtual machine 110 and the GPU partition.

In one or more implementations, the VM allocation 310 may involve allocating less than an entirety of a single GPU 116 as a GPU partition to a virtual machine. Consider an example in which the GPU partition request 302 requests a virtual machine with a GPU partition having at least 2.5 gigabytes (GB) of GPU RAM but in which each of the GPUs 116 have at least 10 GB of GPU RAM. In this example, the GPU partitioning manager 118 may allocate a portion of one of the GPUs 116 (e.g., a quarter of one of the GPUs 116) for a GPU partition and configure the virtual machine 110 to leverage this partition. The GPU partitioning manager 118 may do so by generating a virtual device with the GPU partition that emulates a full, physical GPU device to the virtual machine 110. Virtual devices allow multiple virtual machines 110 to simultaneously leverage the functionality of a single GPU 116. Exposing the functionality of the GPUs 116 to the virtual machines 110 as virtual devices also allows the GPU partitioning manager 118 to configure a virtual machine with functionality provided by partitions of multiple GPUs 116, e.g., multiple GPUs of a single host or multiple GPUs of different hosts.

In connection with the VM allocation 310, the GPU partitioning manager 118 is configured to provide GPU fulfillment notification 312 to the GPU-partition requestor. The GPU fulfillment notification 312 is configured to indicate to the GPU-partition requestor the extent to which the GPU partition request 302 can be fulfilled. By way of example, if the GPU partition request 302 requests a virtual machine with a GPU partition having at least 2.5 GB of GPU RAM, and if the GPU partitioning manager 118 determines that a GPU having 5 GB of GPU RAM is available and allocates at least a portion of this GPU to a partition to fulfill the request, then the GPU fulfillment notification 312 can indicate that a virtual machine is being exposed with a GPU partition having at least 2.5 GB of GPU RAM and up to 5 GB RAM. As noted above, the capabilities requested and the capabilities used to fulfill the GPU partition request 302 may be governed by service agreements. For instance, if a user of the client device 102 has paid for a service that includes 2.5 GB of GPU RAM, then regardless of an amount of GPU RAM requested, the GPU partitioning manager 118 allocates resources of the GPUs 116 corresponding to 2.5 GB of GPU RAM. As discussed in relation to FIG. 4B, a format of the GPU fulfillment notification 312 may also be based on the GPU abstraction model 202.

Based on allocation of the GPUs 118 (or at least a portion of the GPUs) for configuring the virtual machine with the GPU partition, the GPU partition may be used to process GPU-input data for the virtual machine. GPU-input data 314 represents data provided to the partition of the GPUs 116 for GPU processing. By way of example, the GPU-input data 314 may represent a stream of video data received over the network 108 that is to be processed for output via the virtual machine and ultimately the client device 102. Examples of GPU-input data include a streaming television data stream, a streaming movie stream, data for a cloud-hosted video game environment, raw video, and a deep learning data set. The illustrated scenario 300 also includes GPU-processed data 316, which represents the data output by the partition of the GPUs 116 based on processing the GPU-input data 314.

In some cases, the GPU-processed data 316 may include information that can be output for display. The GPU-processed data 316 may also be configured as non-rendered data, however. Examples of the GPU-processed data 316 include television shows, movies, and video game scenes, as well as models and neural networks learned from deep learning data sets, encoded video, and data for which the GPUs 116 accelerate processing relative to other processors. The interactions between partitions of the GPUs 116 and the virtual machines 110 may involve the communication of different information and/or instructions without departing from the spirit or scope of the techniques described herein.

Example GPU Partition Request and Fulfillment Notification

Figure 4A:
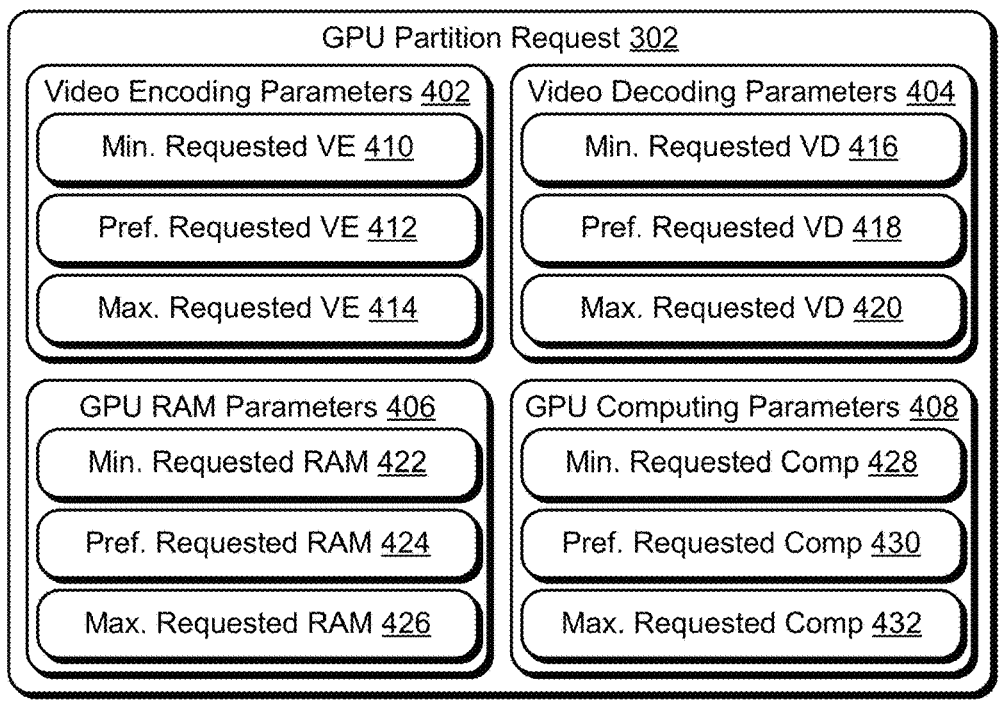
FIGS. 4A and 4B are diagrams depicting example configurations of a GPU-partition request and fulfillment notification in accordance with one or more implementations.
Figure 4B:
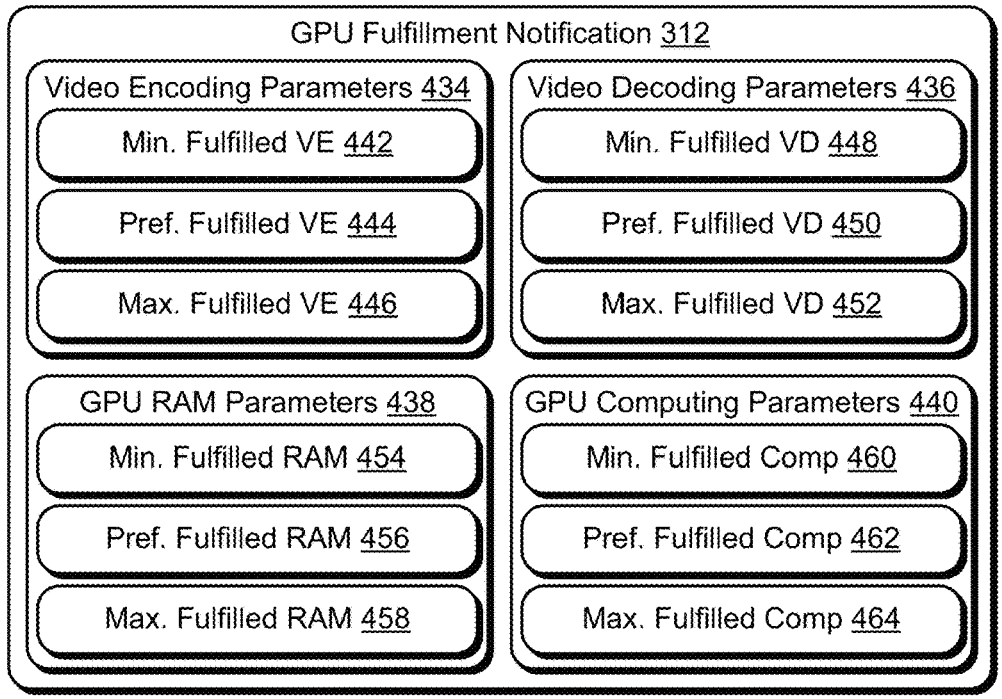

FIGS. 4A and 4B depict examples generally at 400 of configurations for a GPU-partition request and fulfillment notification in accordance with one or more implementations. In particular, FIG. 4A depicts the GPU partition request 302 and FIG. 4B depicts the GPU fulfillment notification 312. In the illustrated examples, the GPU partition request 302 and the GPU fulfillment notification 312 are formatted according to the GPU abstraction model 202 of FIG. 2.

The GPU partition request 302 is formatted according to the GPU abstraction model 202 insofar as it includes video encoding parameters 402, video decoding parameters 404, GPU RAM parameters 406, and GPU computing parameters 408. In accordance with one or more implementations, a GPU-partition requestor can specify for each capability represented by the abstraction model, a minimum requested amount of the capability, a maximum amount of the capability, and a preferred amount. For instance, one of the virtual machines 110 or the client device 102 may request via the GPU partition request 302 a virtual machine 110 with a GPU partition having at least 2.5 GB GPU RAM, but no more than 10 GB GPU RAM, and preferably 5 GB GPU RAM. Accordingly, each parameter of the GPU partition 302 request is depicted with a minimum, preferred, and maximum requested value.

The video encoding parameters 402 of the GPU partition request 302 include minimum requested video encoding 410, preferred requested video encoding 412, and maximum requested video encoding 414. The video decoding parameters 404 of the GPU partition request 302 include minimum requested video decoding 416, preferred requested video decoding 418, and maximum requested video decoding 420. The GPU RAM parameters 406 of the GPU partition request 302 include minimum requested RAM 422, preferred requested RAM 424, and maximum requested RAM 426. The GPU computing parameters 408 of the GPU partition request 302 include minimum requested computing 428, preferred requested computing 430, and maximum requested computing 432.

Like the GPU partition request, the GPU fulfillment notification 312 depicted in FIG. 4B is formatted according to the GPU abstraction model insofar as it includes video encoding parameters 434, video decoding parameters 436, GPU RAM parameters 438, and GPU computing parameters 440. In accordance with one or more implementations, values are specified to indicate the extent to which each capability represented by the abstraction model is configured to be fulfilled by an assigned GPU partition. The extent of the fulfillment is indicated in terms of a minimum amount the capability will be fulfilled, a preferred amount the capability will be fulfilled, and a maximum amount the capability will be fulfilled. For instance, the parameters may indicate that a partition requestor will be provided with a virtual machine configured with a GPU partition having at least 2.5 GB GPU RAM, but no more than 10 GB GPU RAM, and preferably 5 GB GPU RAM. As noted above though, the extent to which the GPU partition request 302 is fulfilled may be governed by a service agreement. Accordingly, the minimum, maximum, and preferred amount may be predetermined. In particular, the minimum and maximum may have the same value.

The video encoding parameters 434 of the GPU fulfillment notification 312 include minimum fulfilled video encoding 442, preferred fulfilled video encoding 444, and maximum fulfilled video encoding 446. The video decoding parameters 436 of the GPU fulfillment notification 312 include minimum fulfilled video decoding 448, preferred fulfilled video decoding 450, and maximum fulfilled video decoding 452. The GPU RAM parameters 438 of the GPU fulfillment notification 312 include minimum fulfilled RAM 454, preferred fulfilled RAM 456, and maximum fulfilled RAM 458. The GPU computing parameters 440 of the GPU fulfillment notification 312 include minimum fulfilled computing 460, preferred fulfilled computing 462, and maximum fulfilled computing 464.

The example configurations depicted in FIGS. 4A and 4B are specific to the example GPU abstraction model 202 depicted in FIG. 2. In implementations where the GPU abstraction model 202 is segmented differently to represent the capabilities of GPUs, the GPU partition request 302 and the GPU fulfillment notification 312 may be configured differently according to the manner in which the model is segmented. Additionally, in scenarios where the GPU abstraction model 202 is used, the GPU partition request 302 and the GPU fulfillment notification 312 may include additional information without departing from the spirit or scope of the techniques described herein. In some implementations, values for the parameters may be indicated in the form of vectors. Additional examples and details are discussed in relation to the following example procedures.

Example Procedures

Figure 5:
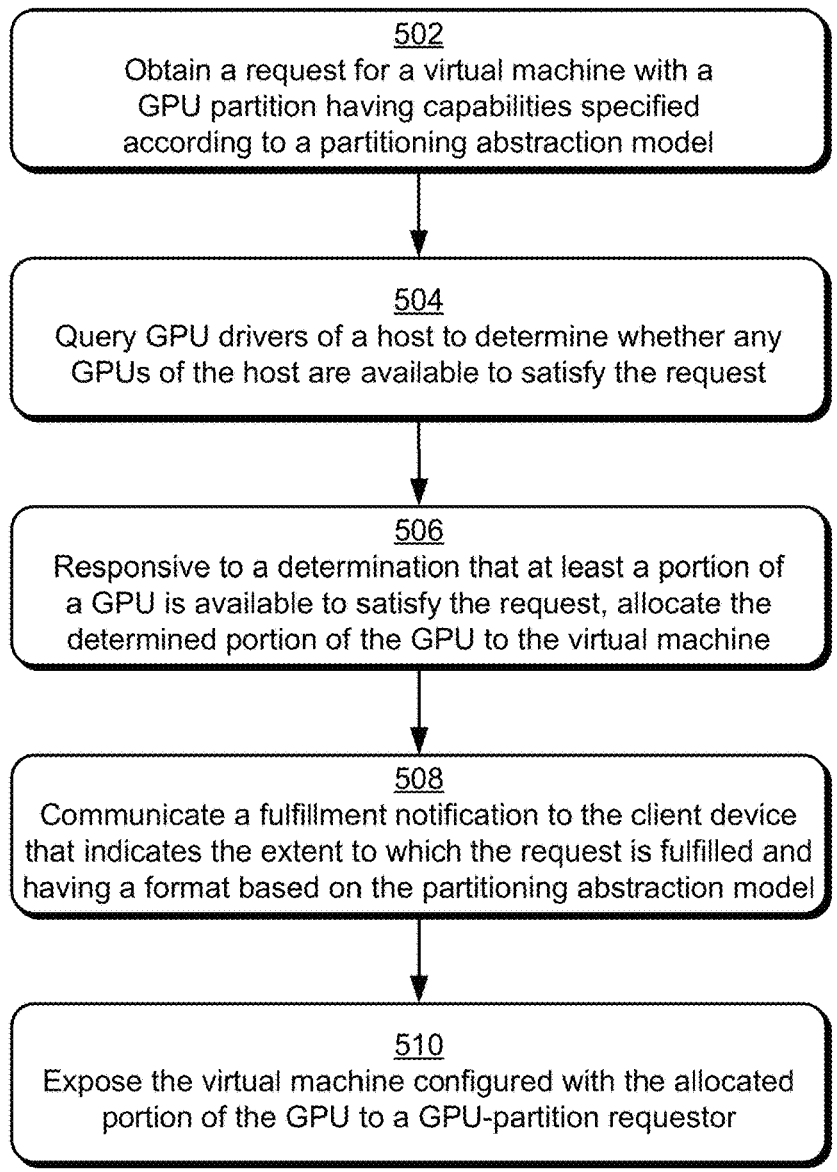
FIG. 5 is a flow diagram depicting an example procedure to allocate GPUs of a host to virtual machines in accordance with one or more implementations.
Figure 6:
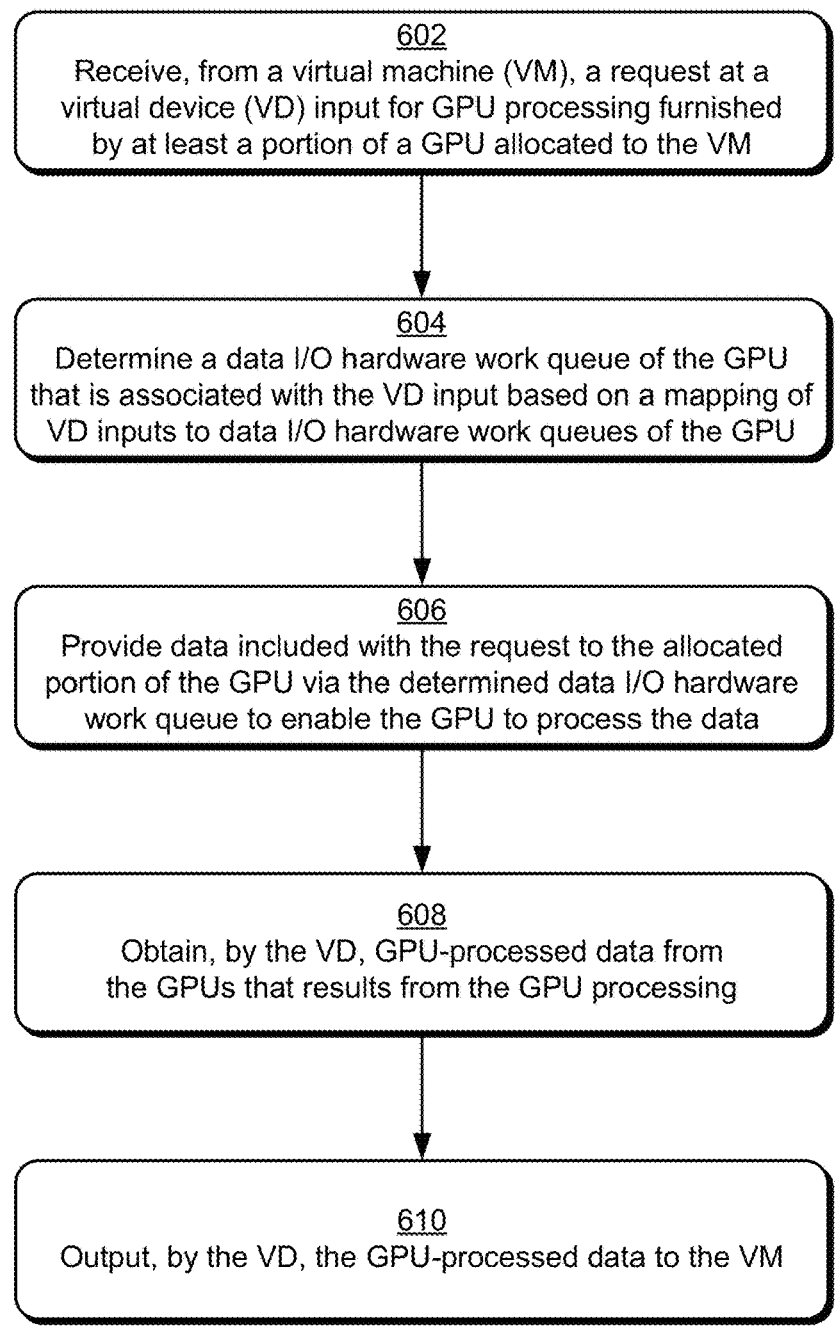
FIG. 6 is a flow diagram depicting an example procedure to furnish functionality of a GPU to a virtual machine via a virtual device in accordance with one or more implementations.

Further aspects of GPU partitioning for virtualization are discussed in relation to example procedures of FIGS. 5 and 6. The procedures are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more host devices, such as via a host device 104 and/or other host device 106 that maintain and provide access to a GPU partitioning manager 118 or otherwise.

FIG. 5 depicts an example procedure 500 for allocating GPUs of a host to virtual machines in accordance with one or more implementations.

At 502, a request is obtained from a client device for a virtual machine configured with a GPU partition. In accordance with the principles discussed herein, the request requests a virtual machine with a GPU partition having capabilities specified according to a partitioning abstraction model. By way of example, the GPU partitioning manager 118 obtains the GPU partition request 302 from a GPU-partition requestor, e.g., one of the virtual machines 110 or the client device 102. Further, the GPU partition request requests one of the virtual machines 110 configured with a partition having the functionality of one of the GPUs 116 or at least a portion of one of the GPUs 116. The GPU partition request 302 is also configured according to the GPU abstraction model 202. With reference to FIG. 4A, for instance, the GPU partition request 302 specifies minimum, preferred, and maximum values for each of the video encoding parameters 402, the video decoding parameters 404, the GPU RAM parameters 406, and the GPU computing parameters 408.

At 504, GPU drivers of a host are queried to determine whether any GPUs of the host are available to satisfy the request. By way of example, the GPU partitioning manager 118 queries 304 the GPU drivers 306 to determine whether any of the GPUs 116 of the host device 104 or the other host device 106 are available to satisfy the GPU partition request 302. In one or more implementations, this involves passing the GPU partition request 302 to the GPU drivers 306 so that the GPU drivers 306 can determine whether respective GPUs 116 are capable of providing the requested capabilities.

Responsive to a determination that at least a portion of a GPU is available to satisfy the request, at 506, the determined portion of the GPUs is allocated to the virtual machine. By way of example, the GPU partitioning manager 118 determines at 504 that at least a portion of one of the GPUs 116 is available to satisfy the GPU partition request 302. In response to this determination, the GPU partitioning manager 118 allocates the determined available portion of the GPUs to a GPU partition. One of the virtual machines 110 is then configured with this GPU partition. As indicated above, GPU partitions may correspond to a portion of one of the GPUs 116, an entire GPU 116, at least a portion of multiple GPUs 116, and so forth. The GPU partition may also correspond to multiple GPUs 116 across the host device 104 and the other host device 106.

At 508, a fulfillment notification is communicated to the client device that indicates an extent to which the request is fulfilled. In accordance with the principles discussed herein, the fulfillment notification is formatted based on the partitioning abstraction model. By way of example, the GPU partitioning manager 118 communicates the GPU fulfillment notification 312 to the GPU-partition requestor. As discussed above, the GPU fulfillment notification 312 indicates the extent to which the GPU partition request 302 is fulfilled. The GPU fulfillment notification 312 is further formatted based on the GPU abstraction model 202. For instance, the GPU fulfillment notification 312 specifies the minimum, preferred, and maximum amount of capabilities that will be provided, as described in more detail in relation to FIG. 4B. It should further be appreciated that in some scenarios, a portion of the GPUs 116 may not be available to satisfy the request. Regardless of whether the GPUs 116 can meet the requested capabilities, a fulfillment notification may be communicated to the client device—in the case where the GPUs may not be available to satisfy the request, the fulfillment notification can indicate that the request simply cannot be fulfilled or that a GPU partition can be configured to partially fulfill the request.

At 510, the virtual machine configured with the allocated portion of the GPUs is exposed to the GPU-partition requestor. By way of example, one of the virtual machines 110 configured at 506 with a GPU partition having the functionality of one of the GPUs 116 (or at least a portion) is exposed to a different one of the virtual machines 110 or the client device 102.

FIG. 6 depicts an example procedure 600 in which a virtual machine utilizes a virtual device to leverage functionality furnished by an allocated portion of a host's GPUs in accordance with one or more implementations.

At 602, a request is received at a virtual-device input from a virtual machine. In accordance with the principles discussed herein, the request requests GPU processing furnished by a GPU partition that corresponds to a portion of a host's GPUs allocated to the virtual machine. By way of example, a request is received at an input of a virtual device (not shown) from one of the virtual machines 110. The received request requests GPU processing furnished by a portion of the host device 104's or the other host device 106's GPUs 116 that are allocated to the virtual machine 110 as a GPU partition.

At 604, a data input/output (I/O) hardware work queue of the GPU that is associated with the virtual-device input is determined. In accordance with the principles discussed herein, the data I/O hardware work queue of the GPU is determined based on a mapping of virtual-device input and output to respective input and output of the GPU's data I/O hardware work queues. By way of example, one of the GPU drivers 306 determines a data I/O hardware work queue of the partition of the GPUs 116 associated with the input of the virtual device. The device driver makes this determination by referencing a mapping of inputs and outputs of the virtual device to respective data I/O hardware work queues of the GPU partition. As used herein, "data I/O hardware work queues" refer to hardware connections of the GPUs 116 that accept the GPU-input data 314 to perform graphics processing. Some of these hardware connections are also capable of outputting the GPU-processed data 316. In any case, the data I/O hardware work queues are different from control work queues, which control operation of the GPUs 116, such as to reset them due to detected errors.

At 606, data included with the request is provided to the allocated portion of GPUs via the determined data I/O hardware work queue. In accordance with the principles discussed herein, this enables the GPU partition to furnish GPU processing using the provided data. By way of example, the GPU-input data 314 is included with the request obtained at 602. In this example, the GPU-input data 314 is provided to the data I/O hardware work queue determined at 604. This allows the partition of the GPUs 116 to process the GPU-input data 314.

At 608, GPU-processed data is obtained by the virtual device from the GPUs. In accordance with the principles discussed herein, the GPU-processed data results from the GPU processing. By way of example, the GPUs 116 corresponding to the GPU partition process the GPU-input data 314 to produce the GPU-processed data 316, which may correspond to a television show, a movie, video game graphics, a model or neural network learned from a deep learning data set, accelerated rendering, and so forth. In any case, the virtual device obtains the GPU-processed data 316 from the GPU partition. At 610, the GPU-processed data is output from the virtual device to the virtual machine. By way of example, the GPU-processed data 316 obtained at 608 is output by the virtual device to one of the virtual machines 110.

Having described example procedures and details in accordance with one or more implementations, consider now a discussion of example systems and devices that can be utilized to implement the various techniques described herein.

Example System and Device

Figure 7:
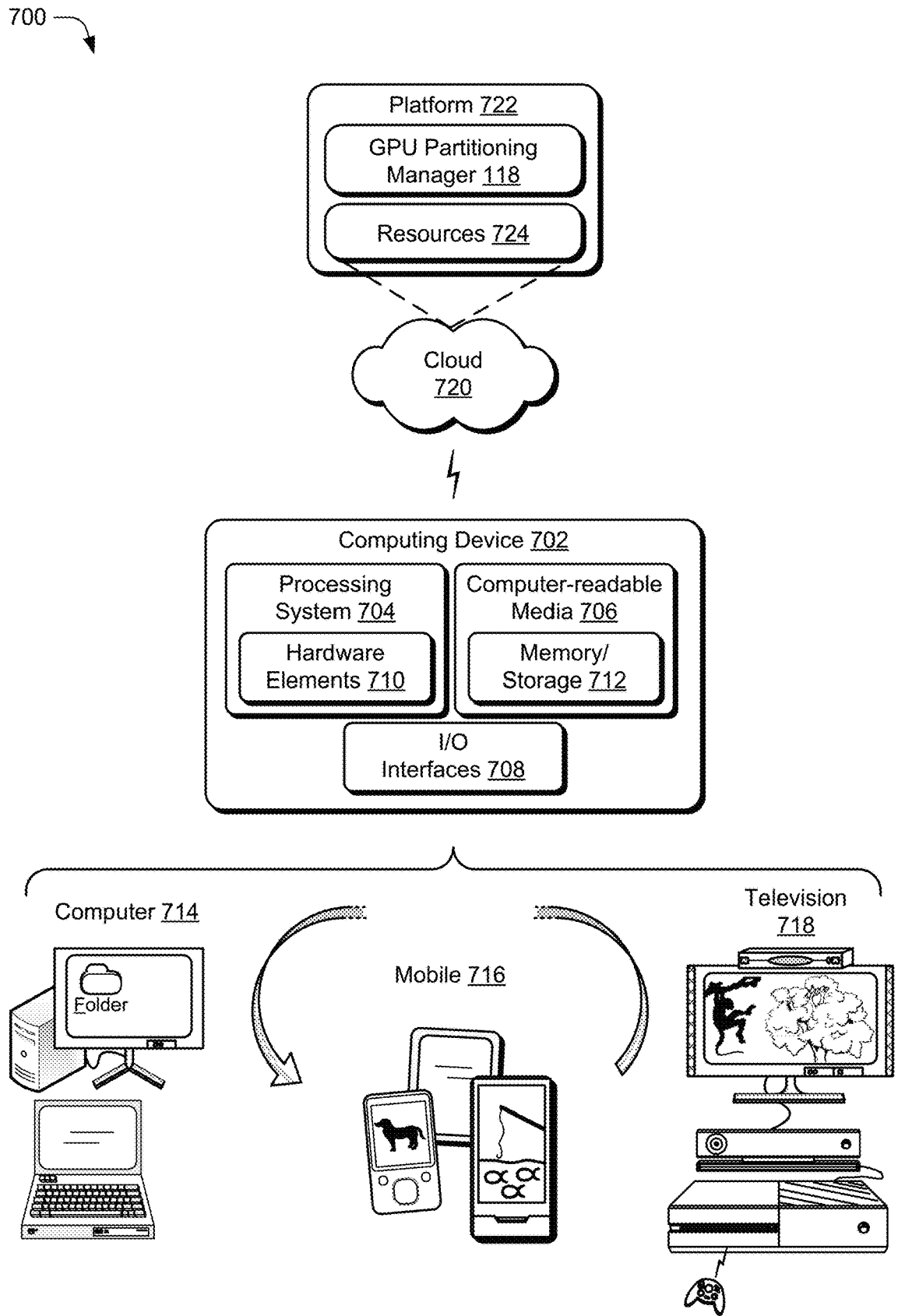
FIG. 7 illustrates an example system including various components of an example device that can be employed for one or more implementations of the techniques described herein.

FIG. 7 illustrates an example system 700 that includes an example computing device 702 that is representative of one or more computing systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, or magnetic disks). The memory/storage 712 may include fixed media (e.g., RAM, ROM, a fixed hard drive) as well as removable media (e.g., Flash memory, a removable hard drive, or an optical disc). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), and a camera (e.g., which may employ visible or non-visible wavelengths such as infrared frequencies to detect movement that does not involve touch as gestures). Examples of output devices include a display device (e.g., a monitor or projector), speakers, a printer, a network card, and a tactile-response device. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 702, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the GPU partitioning manager 118 and the interface 112, and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, and netbook.

The computing device 702 may also be implemented as the mobile 716 class of device that includes mobile devices, such as a mobile phone, portable music player, portable gaming device, a tablet computer, or a multi-screen computer. The computing device 702 may also be implemented as the television 718 class of device that includes devices having or connected to generally larger screens in casual viewing environments. These devices include televisions, set-top boxes, and gaming consoles.

The techniques described herein may be supported by these various configurations of the computing device 702 and are not limited to the specific examples of the techniques described herein. For example, the functionality of the GPU partitioning manager 118 and other modules may also be implemented all or in part through use of a distributed system, such as over a "cloud" 720 via a platform 722 as described below. The GPU partitioning manager 118 may also be implemented by a host device of the platform 722, such as by one or more servers of a datacenter. The GPU partitioning manager 118 may also be implemented by an individual computing device 702 or host as described herein.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network. The service may include virtualization services implemented via a suitably configured virtual machine manager module, such as one that includes the GPU partitioning manager 118.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

EXAMPLE IMPLEMENTATIONS

Example implementations of techniques described herein include, but are not limited to, one or any combinations of the following examples:

Example 1

A method implemented by a host device, the method comprising: obtaining, from a GPU-partition requestor, a request for a virtual machine with graphics processing unit (GPU) functionality, the GPU functionality being represented by a model having a plurality of segments that represent different GPU capabilities, and the request requesting the GPU functionality by specifying the different GPU capabilities; responsive to a determination that at least a portion of the GPUs are available to provide the GPU functionality, allocating the determined available portion of the GPUs to the virtual machine to configure the virtual machine with a GPU partition having the GPU functionality; and exposing the virtual machine with the GPU partition having the GPU functionality to the GPU-partition requestor.

Example 2

A method as described in example 1, wherein the plurality of segments includes at least one of: a video encoding segment that represents capability of a GPU to generate encoded video from raw video; a video decoding segment that represents capability of a GPU to play the encoded video and video files; a GPU random access memory (RAM) segment that represents an amount of memory available to a GPU; or a GPU computing segment that represents an amount of GPU processing a GPU can perform.

Example 3

A method as described in example 1, wherein the request specifies at least one of: a minimum amount for each of the different GPU capabilities; a preferred amount for each of the different GPU capabilities; or a maximum amount for each of the different GPU capabilities.

Example 4

A method as described in example 1, further comprising communicating a fulfillment notification to the GPU-partition requestor that indicates an extent to which the GPU partition meets the specified GPU capabilities.

Example 5

A method as described in example 4, wherein the fulfillment notification specifies at least one of: a minimum amount of each of the different GPU capabilities to be provided with the GPU partition; a preferred amount of each of the different GPU capabilities to be provided with the GPU partition; a maximum amount of each of the different GPU capabilities to be provided with the GPU partition.

Example 6

A method as described in example 1, wherein configuring the virtual machine with the GPU partition enables the virtual machine to provide GPU-input data to the allocated portion of GPUs and the allocated portion of GPUs to process the GPU-input data to provide GPU-processed data to the virtual machine.

Example 7

A method as described in example 6, wherein configuring the virtual machine with the GPU partition includes generating a virtual device to furnish the GPU functionality of the allocated portion of the GPUs to the virtual machine.

Example 8

A method as described in example 6, further comprising mapping input and output of a virtual device to respective data input/output (I/O) hardware work queues of the allocated portion of GPUs.

Example 9

A method as described in example 1, wherein the GPU-partition requestor comprises a different virtual machine or a client device.

Example 10

A method as described in example 1, wherein the determining includes querying GPU drivers maintained by the host device regarding whether respective GPUs meet the specified GPU capabilities.

Example 11

A method as described in example 1, wherein the allocating is based on a service agreement that defines an amount of the different GPU capabilities the GPU-partition requestor is allowed, and the allocated portion of GPUs provides the GPU partition with the GPU functionality in the defined amount.

Example 12

A host device comprising: graphics processing units (GPUs) to furnish GPU functionality; a GPU model that represents the GPU functionality with a plurality of segments indicative of different GPU capabilities; GPU drivers to indicate the GPU functionality provided by a respective GPU according to the different GPU capabilities; a processor; and computer-readable media having instructions stored thereon that are executable by the processor to implement a GPU partitioning manager to perform operations comprising: determining that at least a portion of the GPUs can handle a request for the GPU functionality by querying the GPU drivers regarding whether the respective GPUs have the different GPU capabilities that are specified in the request; allocating the determined portion of the GPUs to a virtual machine to configure the virtual machine with a GPU partition having the GPU functionality; and exposing the virtual machine to a GPU-partition requestor that sent the request.

Example 13

A host device as described in example 12, wherein the operations further comprise communicating a fulfillment notification to the GPU-partition requestor that indicates an extent to which the GPU partition has the different GPU capabilities specified in the request.

Example 14

A host device as described in example 12, wherein the operations further comprise: determining that the GPUs cannot handle an additional request for the GPU functionality; and communicating a fulfillment notification to device GPU-partition requestor that sent the additional request, the fulfillment notification indicating that the additional request is not fulfilled.

Example 15

A host device as described in example 12, wherein the plurality of segments includes: a video encoding segment that represents capability of a GPU to generate encoded video from raw video; a video decoding segment that represents capability of a GPU to play the encoded video and video files; a GPU random access memory (RAM) segment that represents an amount of memory available to a GPU; and a GPU computing segment that represents an amount of GPU processing a GPU can perform.

Example 16

A host device as described in example 12, wherein the request specifies: a minimum amount for each of the different GPU capabilities; a preferred amount for each of the different GPU capabilities; and a maximum amount for each of the different GPU capabilities.

Example 17

A method implemented by a host device, the method comprising: receiving, from a virtual machine and at an input of a virtual device, a request requesting GPU functionality furnished by a portion of GPUs allocated to the virtual machine; determining a data input/output (I/O) hardware work queue of the portion of GPUs that is associated with the input of the virtual device based on a mapping of virtual-device inputs to data I/O hardware work queues of the portion of GPUs; providing GPU-input data included with the request to the portion of GPUs via the determined data I/O hardware work queue to enable the portion of GPUs to furnish the requested GPU functionality using the provided GPU-input data; obtaining, by the virtual device, GPU-processed data from the portion of GPUs that results from the GPU functionality furnished by the portion of GPUs; and outputting, by the virtual device, the GPU-processed data to the virtual machine.

Example 18

The method as described in example 17, further comprising allocating the portion of GPUs to the virtual machine to furnish at least the requested GPU functionality to the virtual machine.

Example 19

The method as described in example 17, wherein the portion of GPUs is allocated to the virtual machine based on a GPU request that identifies a GPU partition defined by the host device according to a model having a plurality of segments that represent different GPU capabilities.

Example 20

The method as described in example 17, wherein the GPU-processed data is provided to a GPU-partition requestor to which the virtual machine is exposed.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter

What is claimed is:

1. A method implemented by a host device having a graphics processing unit (GPU), the method comprising:
   receiving, at the host device, a request for a virtual machine with GPU functionality, the request including data indicating a requested amount of a GPU capability of the GPU functionality, the GPU capability being one of a video encoding capability, a video decoding capability, or a GPU computing capability;
   upon receiving the request, determining whether the GPU of the host device is available to provide the requested amount of the GPU capability;
   in response to determining that the GPU of the host device is available to provide the requested amount of the GPU capability, allocating an available portion of the GPU functionality of the GPU of the host device to the virtual machine and configuring the virtual machine with a GPU partition having the requested amount of the GPU capability; and
   providing access to the virtual machine with the GPU partition having the requested amount of the GPU capability in response to the received request.

2. The method of claim 1 wherein:
   receiving the request includes receiving a request including data indicating a requested amount of at least two of the video encoding capability, the video decoding capability, or the GPU computing capability; and
   determining whether the GPU of the host device is available includes determining whether the GPU of the host device is available to provide the requested amount of at least two of the video encoding capability, the video decoding capability, or the GPU computing capability.

3. The method of claim 1 wherein the data of the request specifies:
   a minimum amount for the individual GPU capabilities;
   a preferred amount for the individual GPU capabilities; or
   a maximum amount for the individual GPU capabilities.

4. The method of claim 1, further comprising communicating a fulfillment notification that indicates an extent to which the GPU partition meets the requested GPU capability.

5. The method of claim 4 wherein the fulfillment notification specifies at least one of:
   a minimum amount of the individual GPU capabilities to be provided with the GPU partition;
   a preferred amount of the individual GPU capabilities to be provided with the GPU partition; or
   a maximum amount of the individual GPU capabilities to be provided with the GPU partition.

6. The method of claim 1, further comprising providing, from the virtual machine, GPU-input data to the allocated portion of the GPU functionality of the GPU and receiving, at the virtual machine, GPU-processed data generated processing the GPU-input data by the GPU.

7. The method of claim 6 wherein configuring the virtual machine with the GPU partition includes generating a virtual device to furnish the GPU functionality of the allocated portion of the GPU functionality of the GPU to the virtual machine.

8. The method of claim 6, further comprising mapping input and output of a virtual device to respective data input/output (I/O) hardware work queues of the allocated portion of the GPU functionality of the GPU.

9. The method of claim 1 wherein receiving requested amount of the GPU capability of the GPU functionality includes a requested amount of video encoding capability.

10. The method of claim 1 wherein receiving requested amount of the GPU capability of the GPU functionality includes a requested amount of video decoding capability.

11. The method of claim 1 wherein receiving requested amount of the GPU capability of the GPU functionality includes a requested amount of GPU computing capability.

12. A host device, comprising:
   a graphics processing unit (GPU) to furnish GPU functionality with one or more GPU capabilities;
   a GPU driver to indicate the GPU functionality provided by the GPU according to the one or more GPU capabilities;
   a processor; and
   a memory having instructions stored thereon that are executable by the processor to cause the host device to:
      upon receiving a request specifying an amount of the individual one or more GPU capabilities of the GPU functionality, determine whether the GPU is capable to service the request by querying the GPU driver regarding whether the GPU has a sufficient amount of the one or more of the GPU capabilities specified in the request;

upon determining that the GPU is capable to service the request, allocate a portion of the GPU functionality of the GPU to a virtual machine and configure the virtual machine with a GPU partition having the allocated portion of the GPU functionality; and providing access to the virtual machine having the GPU partition in response to the request.

13. The host device of claim 12 wherein the memory having additional instructions executable by the processor to cause the host device to communicate a fulfillment notification that indicates an extent to which the GPU partition has the requested amount of the one or more GPU capabilities.

14. The host device of claim 12 wherein the memory having additional instructions executable by the processor to cause the host device to:

determine that the GPU is not capable to service the request; and communicate a fulfillment notification indicating that the additional request is not fulfilled.

15. The host device of claim 12 wherein the one or more GPU capabilities include:

a video encoding capability of the GPU to generate encoded video from raw video;

a video decoding capability of the GPU to play the encoded video and video files; or a GPU computing capability that represents an amount of GPU processing the GPU can perform.

16. The host device of claim 12 wherein the request specifies:

a minimum amount for the individual one or more GPU capabilities;

a preferred amount for the individual one or more GPU capabilities; or a maximum amount for the individual one or more GPU capabilities.

17. A method implemented by a host device having a graphical processing unit (GPU) and hosting a virtual machine and a virtual device, the method comprising:

receiving, at an input of the virtual device, a request from the virtual machine requesting GPU functionality furnished by the GPU, the request having data indicating a requested amount of a video encoding capability, a video decoding capability, or a GPU computing capability of the GPU functionality;

determining a data input/output (I/O) hardware work queue of the GPU that is associated with the input of the virtual device;

providing GPU-input data to the GPU via the determined data I/O hardware work queue to enable the GPU to furnish the requested GPU functionality using the provided GPU-input data;

obtaining, by the virtual device, GPU-processed data from the GPU that results from the GPU functionality furnished by the GPU to the virtual machine; and outputting, by the virtual device, the GPU-processed data to the virtual machine.

18. The method of claim 17, further comprising allocating the GPU to the virtual machine to furnish at least the requested GPU functionality to the virtual machine.

19. The method of claim 17 wherein the GPU is allocated to the virtual machine based on a GPU request that identifies a GPU partition defined by the host device according to a model having a plurality of segments individually representing different GPU capabilities.

20. The method of claim 17 wherein the GPU-processed data is provided to a GPU-partition requestor to which the virtual machine is exposed.

* * * * *